(12) United States Patent
Krahn-Lau et al.

(10) Patent No.: US 7,896,441 B2
(45) Date of Patent: Mar. 1, 2011

(54) VEHICLE SEAT

(75) Inventors: Mareike Krahn-Lau, Hannover (DE); Klaus-Dieter Habendank, Stadthagen (DE)

(73) Assignee: Faurecia Autositze GmbH (DE)

( * ) Notice: Subject to any disclaimer, the term of this patent is extended or adjusted under 35 U.S.C. 154(b) by 267 days.

(21) Appl. No.: 12/145,135

(22) Filed: Jun. 24, 2008

(65) Prior Publication Data

US 2009/0001796 A1     Jan. 1, 2009

(30) Foreign Application Priority Data

Jun. 26, 2007   (DE) ................. 10 2007 029 495

(51) Int. Cl.
*B60N 2/02* (2006.01)
(52) U.S. Cl. .............. 297/378.12; 297/378.1; 297/378.13; 296/65.19; 296/65.17; 296/65.18
(58) Field of Classification Search .......... 297/378.1, 297/378.12, 378.13; 296/65.09, 65.17, 65.18
See application file for complete search history.

(56) References Cited

U.S. PATENT DOCUMENTS

| | | | | |
|---|---|---|---|---|
| 3,410,600 | A | * | 11/1968 | Thorpe ...................... 296/66 |
| 4,639,040 | A | * | 1/1987 | Fujita et al. ............. 297/378.13 |
| 4,773,693 | A | * | 9/1988 | Premji et al. ............. 296/65.03 |
| 5,566,431 | A | * | 10/1996 | Haglund ..................... 24/633 |
| 5,713,634 | A | * | 2/1998 | Koike ..................... 297/378.13 |
| 6,698,837 | B2 | * | 3/2004 | Pejathaya et al. ...... 297/378.12 |
| 6,793,285 | B1 | * | 9/2004 | Tame ........................ 297/336 |
| 6,883,868 | B2 | | 4/2005 | Yoshida |
| 7,377,584 | B2 | * | 5/2008 | Griswold et al. ....... 297/216.12 |
| 2007/0182231 | A1 | * | 8/2007 | Lutzka et al. .......... 297/378.12 |
| 2008/0252129 | A1 | * | 10/2008 | Nathan et al. ......... 297/378.11 |

FOREIGN PATENT DOCUMENTS

| | | |
|---|---|---|
| CA | 2337037 | 1/2000 |
| DE | 19514380 | 11/1995 |
| DE | 19918785 | 2/2000 |
| DE | 102004044363 | 3/2006 |
| DE | 102004059027 | 6/2006 |
| DE | 202005006992 | 9/2006 |

* cited by examiner

*Primary Examiner*—Laurie K Cranmer
(74) *Attorney, Agent, or Firm*—Robert W. Becker; Robert Becker & Assoc.

(57) ABSTRACT

A vehicle seat having a seat frame that in its rear region is adapted to be releasably arrested on structural elements by a left arresting device and a right arresting device, which are releasable separately relative to one another, preferably via different displacement processes. A back rest frame is preferably releasably arrested on the seat frame via a freely pivotable device, such as an arresting control. An actuating device, especially an actuating handle, that is activatable by the user is preferably provided for releasing the freely pivotable device. A first one of the arresting devices can be releasable by the actuating device, whereby different displacement paths can be provided for the release of the freely pivotable device and of the first arresting device. One or more driver systems can be provided for forming idle paths or free play.

19 Claims, 3 Drawing Sheets

VEHICLE SEAT

The instant application should be granted the priority date of Jun. 26, 2007 the filing date of the corresponding German patent application DE 10 2007 029 495.8.

BACKGROUND OF THE INVENTION

The present invention relates to a vehicle seat having a seat frame.

A vehicle seat of this general type is known from DE 10 2004 044 363 A1, and is provided with a longitudinally displaceable seating portion and a back rest that is hinged thereto. In this upright position of use, the back rest, or its frame, which is arrested by arresting controls, can in general be adjusted with regard to its angle within a comfort pivot range. After loosening the arresting controls, the back rest can be folded forward; for this purpose, the user generally actuates an actuation handle, for example a release lever that is pivotable about the back rest axis, so that the back rest, or its frame, can subsequently be folded forward beyond the comfort pivot range, for example into a horizontal functional position that can serve, for example, as a table position, as a cargo position for increasing the size of a storage space disposed behind it, or also for other purposes. Proceeding from the folded forward cargo position, furthermore with some vehicle seats the rear legs can be disconnected in order to be able to pivot the vehicle seat forward about a front pivot axis into a storage position or a rolled-up position. However, the systems utilized for this purpose are generally very complicated and/or expensive.

Appropriate handles are provided for the various displacements, for example an actuating lever for the back rest inclination adjustment within the comfort pivot range, furthermore an easy-entry handle for the release of the arresting controls, and possibly a handle for the release of the rear arresting devices. If the user does not release the rear arresting devices in the folded forward functional position, the storage position can generally not be subsequently achieved, so that the vehicle seat might first have to again be returned to the starting position. To prevent an unwanted release out of the position of use, additional coupling mechanisms are therefore provided to some extent.

DE 699 19 359 T2 shows a foldable and shiftable vehicle seat arrangement according to which a rear vehicle seat can be displaced into a storage position after its rear legs have been released. In this connection, a coupling is provided between its rear legs and the front legs via a mechanism that, however, is relatively complex and is thus expensive.

U.S. Pat. No. 6,883,868 B2 shows a vehicle seat that enables a folding of the back rest and a longitudinal displacement. DE 199 18 785 C2 shows a fitting for a vehicle seat that enables a backrest folding and a leg release. A lower portion of the fitting in a sitting position arrests with the vehicle structure via a latch, whereby an upper portion that is rotatable relative to the lower portion is connected to the back rest. Furthermore, a safety lever is provided to secure the upper portion in a package position of the vehicle seat, and also provided is an additional safety device that is independent of the latch and the safety lever.

DE 195 14 380 C2 shows a vehicle seat having a seat frame, the rear, releasably arrested legs, and a back rest that is connected with the seat frame via hinge fittings that can be arrested, whereby the back rest can be folded forward into a functional position. The legs can be released only when the back rest is in its folded forward functional position. The mechanism disclosed here is also relatively complex and expensive.

It is an object of the present application to provide a vehicle seat that although it has a relatively straightforward construction enables a diversified and multi-purpose adjustment.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
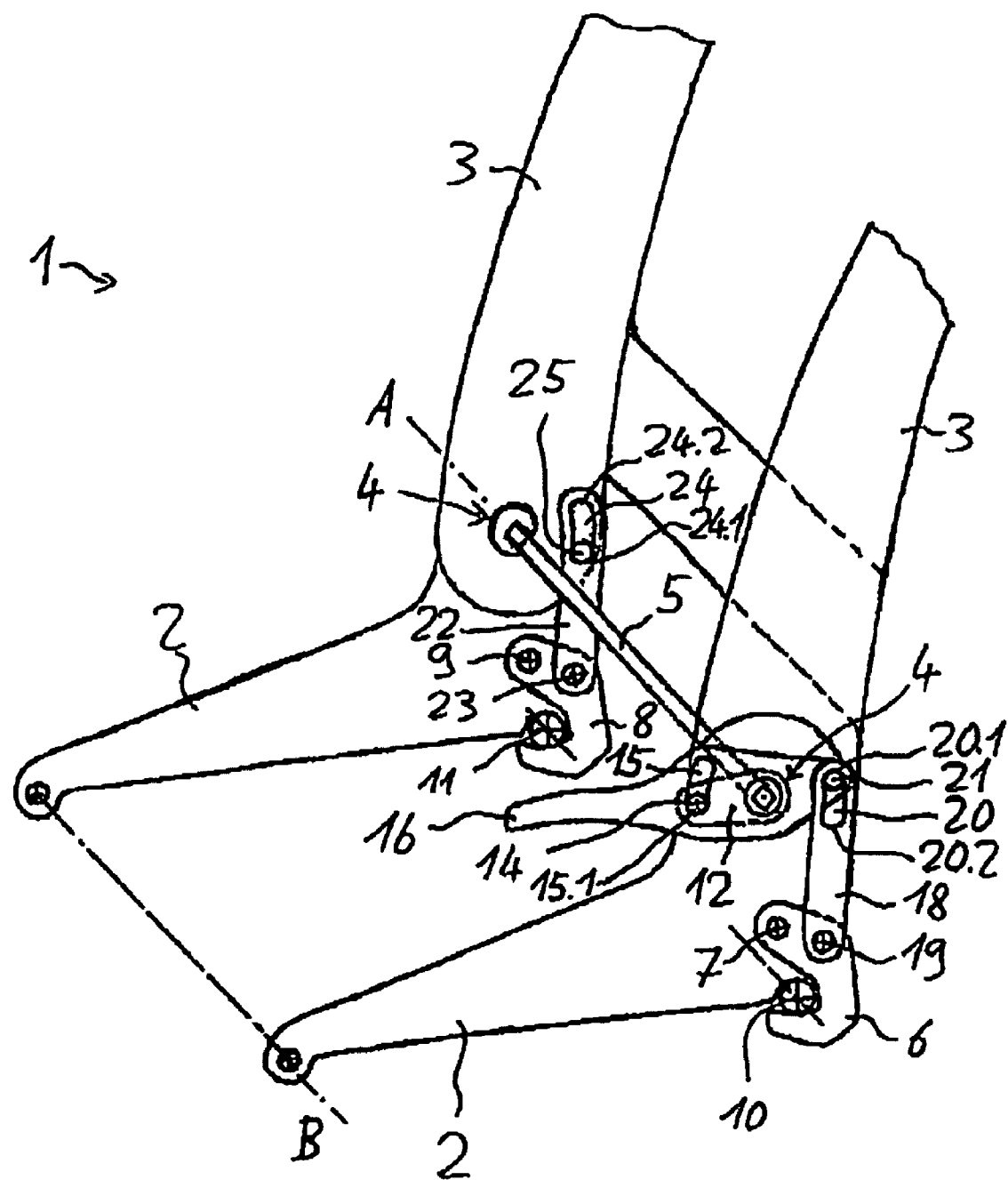
FIG. 1 is a perspective view of one exemplary embodiment of an inventive vehicle seat in the arrested, upright position of use.

The vehicle seat of the present application comprises a left arresting device and a right arresting device, wherein the left and right arresting devices are adapted to releasably arrest the seat frame on structural elements at the rear region of the seat frame, and wherein the left and right arresting devices are releasable separately relative to one another.

The basic concept of the present invention is to release or unlatch the two rear arresting devices of the seat frame (sitting portion, seat cushion support, seat frame) independently from one another, i.e. separately from one another. These two release processes can be effected during different adjustments or displacements.

The two rear arresting devices (rear legs) of the seat frame engage structural elements, which in particular can be structural elements of the vehicle chassis or can also be structural elements of upper rails that are displacable relative to lower rails that are mounted on the chassis.

Pursuant to the present invention, one of the arresting devices can be released directly via an actuating device, especially a handle, and the other arresting device can be released separately therefrom either via a further actuating device or in particular also by the displacement of a seat element. Such a configuration is in particular relevant for a vehicle seat having an upright position of use, a functional position (table position) achieved after release of a freely pivotable device (in particular arresting controls, but also for example gear fittings) that is provided between back rest and seat frame, and a storage or wound-up position achieved by pivoting the entire seat forward about a forward pivot axis or shaft. By means of the actuating device, for example a pivotable handle, the user can release the freely pivotable device of the back rest on the seat frame without in so doing already releasing one of the two rear arresting devices. During the subsequent folding forward of the back rest, the folding movement thereof can release a first one of the two arresting devices, so that the vehicle seat is initially still arrested in this functional position by the other rear arresting device.

The foregoing is based on the inventive recognition that this asymmetrical, one sided release in the folded-forward functional position is in principle not dangerous, since no person is seated in the seat and due to the low loading of the seat no danger can occur even in the event of a crash. Proceeding from the functional position, the user can subsequently release the other arresting device, so that the vehicle seat can be pivoted forwardly into the storage position.

Pursuant to the present invention, in particular a diversified adjustment or displacement is possible via merely one actuating device, in particular via a single handle. In this connection, a handle, for example an actuating lever that is pivotable in the back rest axis, can be used on the one hand for the release of the freely pivotable device, and on the other hand for the release of the second arresting device out of the functional position for the subsequent pivoting forward of the seat into the storage position.

Pursuant to the present invention, driver devices or mechanisms can advantageously be provided in order to preclude undesired adjustments or displacements during the respective actuation of the handle. The driver mechanisms can, for example, be embodied as slot/pin couplings having an appropriate free play. In this connection, such couplings can, in particular, be provided between the back rest frame and one of the two arresting devices, furthermore between the handle and the other arresting device, as well as also between the actuating handle and a release lever for release of the freely pivotable device.

Further specific features of the present application will be described in detail subsequently.

Description of Specific Embodiments

Referring now to the drawings in detail, shown is a vehicle seat 1 having a seat frame 2 and a back rest or reclining frame 3. In this connection, merely structural parts and frame parts of the vehicle seat are shown without the additional cushions and covers. A respective arresting control 4 is provided to the right and to the left, as a freely pivoting device, between the seat frame 2 (seat portion, seat cushion support) and the back rest frame 3. The arresting control 4 enables an arresting of the back rest frame 3 in the upright position of use shown in FIG. 1, in which in general a back rest angle adjustment is possible within a comfort range. After releasing the two arresting controls 4, the back rest frame 3 can be folded or tilted forward about the back rest axis A into the functional position, in particular a table position, shown in FIG. 2. The two arresting controls 4 are interconnected via a release shaft 5 and in general are spring biased into their locking or arresting position.

A left locking or arresting hook or catch 6 is hinged in a pivot joint 7 in a rear, left region of the seat frame 2 (as viewed in the direction of travel); correspondingly, a right locking or arresting hook or catch 8 is hinged in a pivot joint 9 in a rear, right region of the seat frame 2. As shown in FIG. 1, the hooks 6 and 8 engage structural elements 10, 11 which can in particular be bolts on a chassis; in the event that the entire vehicle seat 1 is in addition to be longitudinally adjustably mounted on upper rails, which in turn are longitudinally adjustable relative to lower rails on the chassis, the structural elements 10, 11 are appropriately provided on the upper rails. The arresting hooks 6, 8 are advantageously open toward the front, and engage via a pivoting movement in a clockwise direction (FIG. 1). In this connection, the arresting hooks 6, 8 are spring biased into their engagement position shown in FIG. 1.

Figure 2:
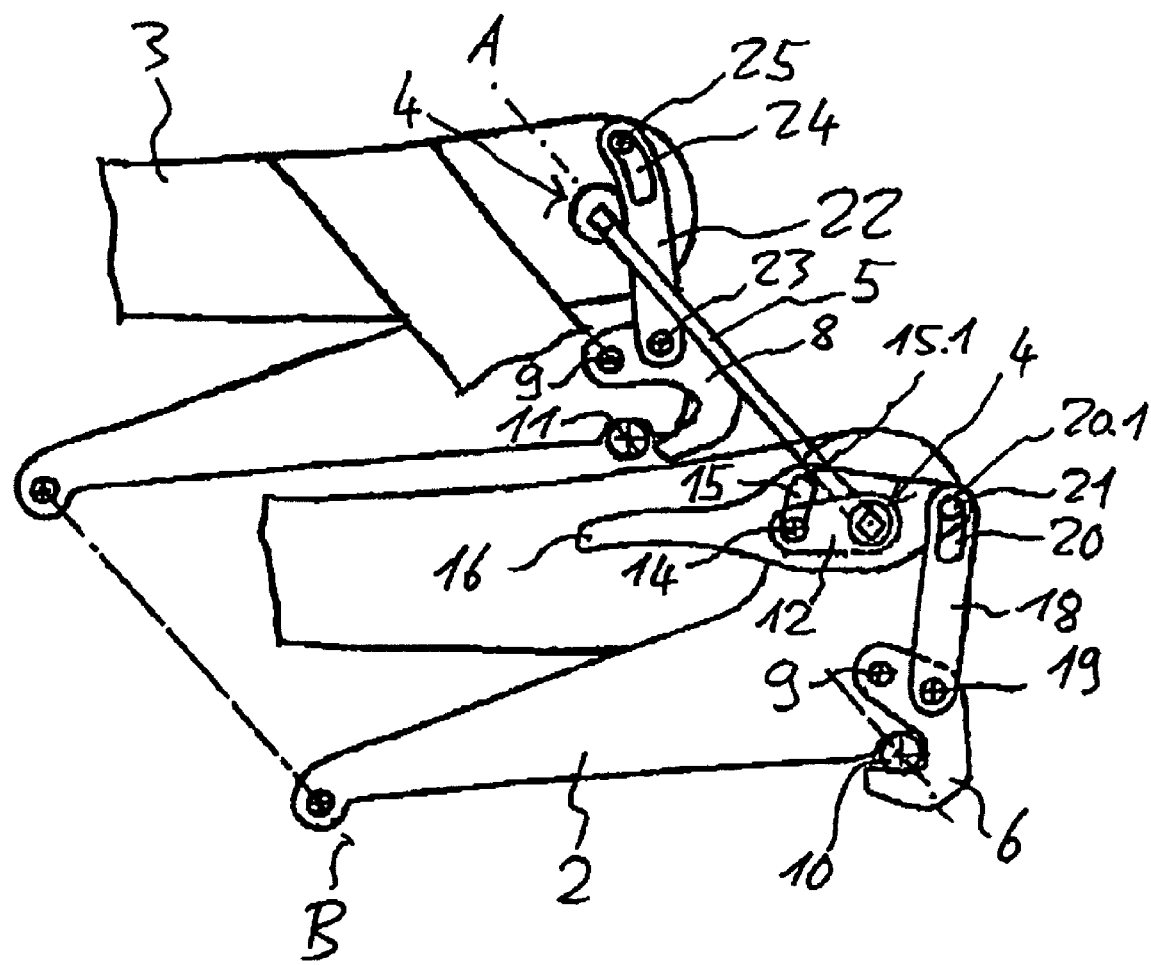
FIG. 2 shows the vehicle seat in the folded-forward functional position (table position) prior to release of the left arresting hook.
Figure 3:
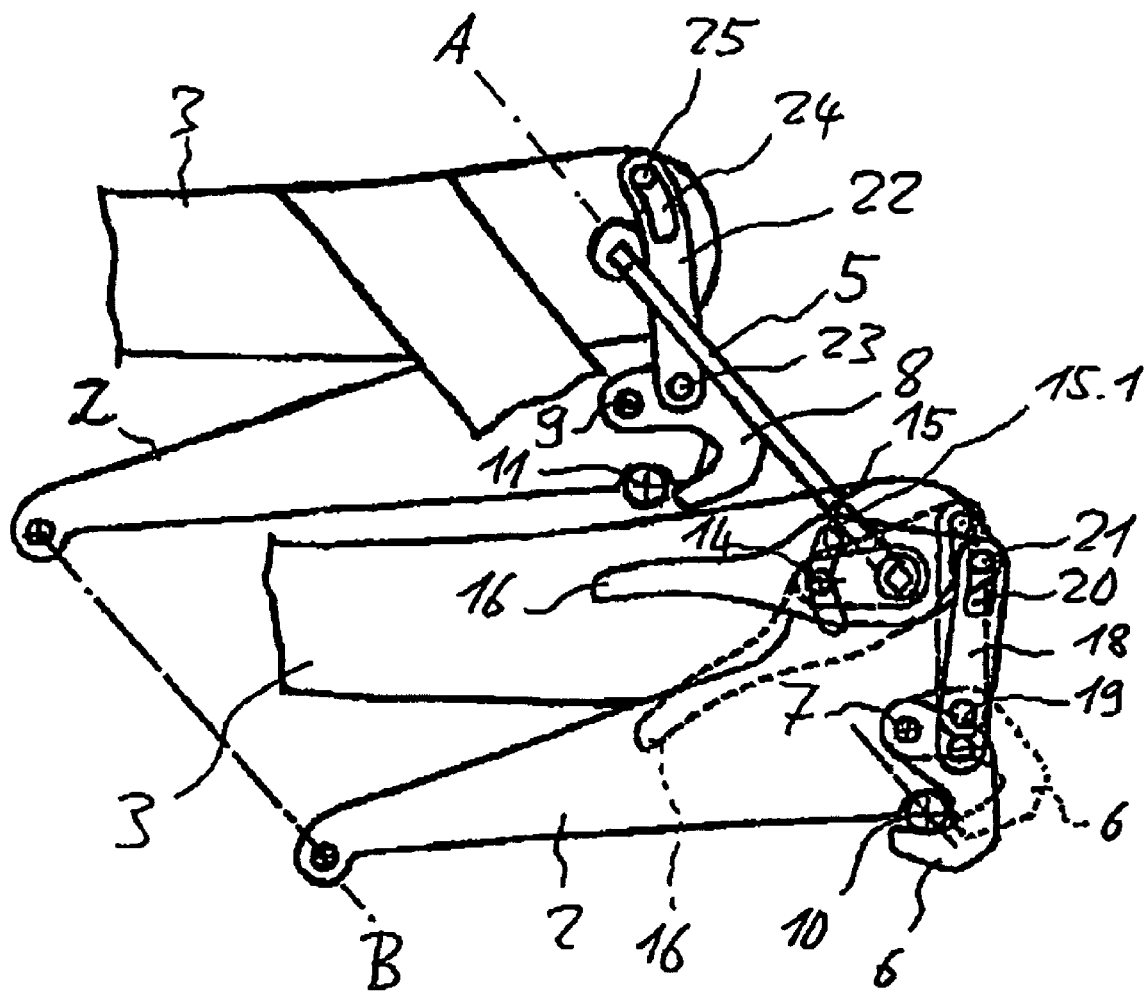
FIG. 3 shows the vehicle seat upon subsequent release of the left arresting hook for the subsequent displacement or adjustment into the storage position.

For releasing the arresting controls 4, a release lever 12 is pivoted upwardly that is provided for example merely on one side, for example on the left side of the seat as shown in FIGS. 1 to 3; furthermore, the release lever 12 is rigidly connected with the release shaft 5, and is pivotable about the back rest axis A. A first pin 14 projects from the release lever 12 in the axial direction and is guided in a curved slot 15 of an actuating lever 16 that is mounted so as to be pivotable in the back rest axis A. Thus, the curved slot 15 and the pin 14 that is guided therein act as a first driver mechanism, whereby the slot 15 defines a free play (dead path) for the first pin 14 within which the release lever 14 is not yet pivoted.

A coupling member 18 is hinged to the left arresting hook 6 in a pivot joint 19, which is disposed beyond the pivot joint or shaft 7 of the arresting hook 6. Formed at the upper end of the coupling member 18 is a second slot 20, in which is guided a second pin 21 that projects in an axial direction from the rear region of the actuating lever 16. Correspondingly, at the right arresting hook 8 a right coupling member 22 is hinged in a pivot joint 23 that is disposed beyond the pivot joint 9, whereby the right coupling member 22 extends appropriately upwardly and is provided with a third slot 24 in its upper region. Guided in the third slot 24 is a third pin 25 that, however, differently than the situation on the left side, is provided on the back rest frame 3, from which it projects axially. In principle, the slots 20 and 24 can be linear or, for example, slightly curved. What is relevant is that these slots permit a displacement path of the respective pin 21, 25 as a free play or dead path, and subsequently enable a displacement path of the respective hook 6 or 8. Pursuant to the present invention, driver mechanisms other than the slot/bolt combinations are also possible.

At its front end, the seat frame 2 is pivotably accommodated in a tumble or topple axis or shaft B. The tumble shaft B is, in turn, formed on a structural component of the vehicle chassis or possibly—when additional longitudinal adjustability is provided—on upper rails that are longitudinally adjustable relative to lower rails provided on the chassis. A pivoting of the vehicle seat 1 about the tumble shaft B is thus possible only after release of the two arresting hooks 6, 8.

FIG. 1 shows the position of use of the vehicle seat 1 with upright back rest frame 3 arrested in position on the seat frame 2. The arresting hooks 6, 8 are arrested in the structural elements 10, 11. In FIG. 1, the first pin 14 of the release lever 14 is disposed at the lower abutment 15.1 of the first slot 15; the second pin 21 provided on the actuating lever 16 is disposed at the upper abutment 20.1 of the second slot 20. In FIG. 1, the third pin 25 that is provided on the backrest frame 3 is disposed on the lower abutment 24.1 of the third slot 24, which thus corresponds to the rear most comfort position of the back rest frame 3. Within the comfort, pivot range of the back rest frame 3, the third pin 25 provided on the back rest frame 3 remains in the third slot 24 without displacing the right coupling member 22, so that the right arresting hook 8 is not pivoted.

To adjust the vehicle seat 1 from the arrested position of use of FIG. 1 into the folded forward functional position of FIG. 2, the user first pivots the actuating lever 16 upwardly, so that the pin 14 of the release lever 12 is immediately carried along by the lower abutment 15.1 of the first slot 15, and the release lever 12 thus releases both of the arresting controls 4 that are connected by the release shaft 5. In so doing, the pin 21 of the actuating lever 16 moves downwardly in the second slot 20 from the upper abutment 20.1 without displacing the left coupling member 18; the pin 21 can arrive against the lower abutment 20.2 of the second slot 20, as a result of which the pivoting movement of the actuating lever 16 is delimited. Since with this release the back rest frame 3 is not yet displaced, the third slot/pin system 24, 25 is not yet affected.

Subsequently, the back rest frame 3—for example by means of its spring biasing or also by manual actuation by the user—is folded toward the front about, for example, approximately 90°, into the functional position shown in FIG. 2, which, for example, can serve as a table position with an essentially horizontal upper side of the back rest, or as a cargo position for extending a storage space located behind it, or—if a central back rest part is provided, also as a loading means.

When this folding occurs, the third pin 25 of the third driver system first arrives at the upper abutment 24.2 of the third slot 24; subsequently, the third pin 25 pulls the right coupling member upwardly and toward the front, so that the right arresting hook 8 pivots toward the rear and upwardly, against its spring bias, and releases the structural element 11. Thus, in the folded forward functional position of FIG. 2, the right arresting hook 8 is released. However, the vehicle seat 1 cannot yet be folded toward the front about its front tumble shaft B, since the left arresting hook 6 is still engaged or arrested on the structural element 10, thus reliably preventing a pivoting forward. Pursuant to the present invention it is recognized in this connection that the arresting position shown in FIG. 2 with arresting of the seat frame 2 on only one side in such a functional position does not create a problem with respect to safety since no user is seated on the seat.

FIG. 2 shows the functional position where the actuating lever 16 has been released by the user, according to which the arresting control 4, due to its spring biasing, can again arrive at its arresting position. The first pin 14 of the first driver system thus again pulls the actuating lever 16 downwardly, so that also the second pin 21 of the second driver system again arrives at the upper abutment 20.1 of the second slot 20.

For the displacement of the vehicle seat 1 from the functional position of FIG. 2 into the storage position of FIG. 3, the user again pivots the actuating lever 16; in the illustrated embodiment, for this purpose the actuating lever 16 is pivoted downwardly into the position shown by dashed lines, so that the first pin 14 of the first driver system provided on the release lever 12 passes from the lower abutment 15.1 of the slot 15 against the upper abutment 15.2 thereof, i.e. remains within the first slot 15 and thus the release lever 12 is not pivoted. However, in FIG. 2 the second pin 21 of the second driver system provided in the rear region of the actuating lever 16 behind the back rest axis A already rests against the upper abutment 20.1 of the second slot 20, so that upon downward pivoting of the actuating lever 16, the left coupling member 18 is pulled upwardly, as a result pivoting the left arresting hook 6 into its release position, so that the left structural element 10 is released. Thus, in FIG. 3 both of the arresting hooks 6, 8 are released, so that the user can subsequently pivot the entire vehicle seat 1 toward the front about, for example, 90° or more about the tumble shaft B, for which purpose the user can, for example, grasp the seat frame 2.

For the return from the front storage position, the user can first fold the vehicle seat 1 toward the rear. Depending upon the configuration of the left arresting hook 6, it can automatically catch and engage the left structural element 10; otherwise, the user again pivots the actuating lever 16 downwardly, hereby enabling an engagement of the left structural element 10 by the left arresting hook 6, so that the position of FIG. 2 is achieved, from which the user again pivots the release lever 12 by pivoting the actuating lever 16 up, thus releasing both of the arresting controls 4, so that the user can subsequently fold the back rest frame 3 upwardly into the position of use of FIG. 1, whereby the third pin 25 provided on the right side of the back rest frame 3 pivots downwardly, thus enabling an arresting of the right arresting hook 8 by engagement of the right structural element 11 by the spring biased right arresting hook 8.

Thus, a complete displacement between the three basic positions of the position of use, the functional position and the storage position is possible, for which purpose merely one release handle needs to be actuated and, as the case may be, the back rest frame 3 is folded forwardly or the entire vehicle seat 1 is pivoted toward the front into the storage position.

The specification incorporates by reference the disclosure of German priority document DE 10 2007 029 495.8 filed Jun. 26, 2007.

The present invention is, of course, in no way restricted to the specific disclosure of the specification and drawings, but also encompasses any modifications within the scope of the appended claims.

We claim:

1. A vehicle seat, comprising:
   a seat frame;
   a left arresting device and a right arresting device, wherein said left and right arresting devices are adapted to releasably arrest said seat frame on structural elements at a rear region of said seat frame, and wherein said left and right arresting devices are releasable separately relative to one another;
   a back rest frame that is foldably hinged to said seat frame;
   a freely pivotable device for releasably arresting said back rest frame; and
   an actuating device for effecting release of said freely pivotable device, wherein said actuating device is adapted to be activated by a user.

2. A vehicle seat according to claim 1, wherein said left and right arresting devices are adapted to be released during different displacement processes.

3. A vehicle seat according to claim 1, wherein said freely pivotable device is in the form of arresting controls.

4. A vehicle seat according to claim 1, wherein said actuating device is an actuating handle.

5. A vehicle seat according to claim 4, wherein said actuating handle is an actuating lever that is pivotable about an axis of said back rest frame.

6. A vehicle seat according to claim 1, wherein only a first one of said two arresting devices is adapted to be released by said actuating device.

7. A vehicle seat according to claim 1, wherein said actuating device is provided with two different displacement paths, further wherein a first displacement path is provided for the release of said freely pivotable device, and wherein a second displacement path is provided for release of one of said two arresting devices.

8. A vehicle seat according to claim 7, wherein said actuating device, for said two displacement paths, is displaceable in different displacement directions, for example an upward pivoting direction and a downward pivoting direction.

9. A vehicle seat according to claim 7, wherein said two displacement paths of said actuating device are disposed successively in the same displacement direction, for example as successive pivot paths.

10. A vehicle seat according to claim 7, wherein said vehicle seat is adapted to be displaced at least between a position of use, in which said back rest frame is upright and arrested, a functional position, which is achieved after release of said freely pivotable device and folding forward of said back rest frame, and a storage position, which is achieved proceeding from the functional position and after release of said two arresting devices and forward pivoting of said seat frame about a forward tumble shaft.

11. A vehicle seat according to claim 10, wherein said actuating device is connected with one of said two arresting devices via a transfer means having a free play, wherein in said first displacement path, upon release of said freely pivotable device, said free play in said transfer means is traversed, and wherein in said second displacement path, said one of said arresting devices is released by said actuating device.

12. A vehicle seat according to claim 11, wherein said transfer means is a hingedly connected coupling member.

13. A vehicle seat according to claim 11, wherein said free play of said transfer means is in the form of a first driver mechanism, further wherein in a comfort pivot range of an upright position of use of said back rest frame said first driver mechanism is in a non-activated free play, and wherein in the folded forward functional position of said back rest frame said first driver mechanism is in an activated position, such that with a subsequent actuation of said actuating device said one of said arresting devices is releasable via said transfer means.

14. A vehicle seat according to claim 13, wherein said transfer means is a coupling member.

15. A vehicle seat according to claim 10, which includes a transfer means having a free play, and a release lever for release of said freely pivotable device, wherein said release lever is connected with said actuating device via said transfer means, and wherein upon release of said one of said arresting devices via said actuating device, said freely pivotable device is not displaced and remains in position.

16. A vehicle seat according to claim 10, wherein a transfer means having a free play connects said back rest frame with the other one of said arresting devices.

17. A vehicle seat according to claim 16, wherein said free play of said transfer means is in the form a third driver mechanism, wherein at angular adjustments of the arrested back rest frame in a comfort pivot range thereof, said third driver mechanism is not activated, and wherein upon forward folding of said back rest frame beyond said comfort pivot range into said functional position said third driver mechanism is activated, resulting in release of a the other one of said arresting devices.

18. A vehicle seat according to claim 10, which includes a first transfer means, a second transfer means and a third transfer means, each of which has a free play in the form of a driver mechanism.

19. A vehicle seat according to claim 18, wherein each driver mechanism is a slot/pin coupling.

* * * * *